(12) United States Patent
Chadwick et al.

(10) Patent No.: US 8,430,601 B1
(45) Date of Patent: Apr. 30, 2013

(54) SYSTEM FOR DEPLOYING FABRIC CLOTH IN MARINE SEDIMENT

(75) Inventors: David B. Chadwick, San Diego, CA (US); Adriane Q. Wotawa-Bergen, San Diego, CA (US); Jeffrey A. Kagan, San Diego, CA (US)

(73) Assignee: The United States of America as represented by The Secretary of the Navy, Washington, DC (US)

( * ) Notice: Subject to any disclaimer, the term of this patent is extended or adjusted under 35 U.S.C. 154(b) by 147 days.

(21) Appl. No.: 13/019,938

(22) Filed: Feb. 2, 2011

Related U.S. Application Data

(60) Provisional application No. 61/382,382, filed on Sep. 13, 2010.

(51) Int. Cl.
*F16L 1/028* (2006.01)

(52) U.S. Cl.
USPC .............................. 405/176; 405/159; 405/164

(58) Field of Classification Search ............... 405/195.1, 405/159, 164, 302.7, 176, 179; 429/532, 429/534, 535, 521
See application file for complete search history.

(56) References Cited

U.S. PATENT DOCUMENTS

| | | | | |
|---|---|---|---|---|
| 1,787,902 A | * | 1/1931 | Herfort | 47/9 |
| 3,618,329 A | * | 11/1971 | Hanson | 405/179 |
| 3,858,166 A | * | 12/1974 | Hammond | 367/133 |
| 4,379,655 A | * | 4/1983 | Brost et al. | 405/176 |
| 4,480,943 A | * | 11/1984 | Leuenberger | 405/172 |
| 4,664,559 A | * | 5/1987 | Berrang | 405/224 |
| 4,724,781 A | * | 2/1988 | Higashimura et al. | 111/200 |
| 5,755,530 A | * | 5/1998 | Garren | 405/159 |
| 6,299,094 B1 | * | 10/2001 | James, Jr. | 242/390 |
| 6,913,854 B1 | * | 7/2005 | Alberte et al. | 429/119 |
| 7,082,981 B2 | * | 8/2006 | Perez, Jr. | 160/24 |
| 8,012,616 B2 | * | 9/2011 | Tender | 429/47 |

OTHER PUBLICATIONS

Tender et al. The first demonstration of a microbial fuel cell as a viable power supply: Powering a meteorological buoy. 2008. J. of Power Sources 179: 571-575.*

Scott et al. Fuel cell power generation from marine sediments: Investigation of cathode materials. 2008. J. Chem. Techno. Biotechnol 83: 1244-1254.*

\* cited by examiner

*Primary Examiner* — Thomas B Will
*Assistant Examiner* — Jessica H Lutz
(74) *Attorney, Agent, or Firm* — Ryan J. Friedl; Kyle Eppele

(57) ABSTRACT

A system for burying fabric cloth in marine sediment includes a sled having first and second ends and a partially open bottom surface proximate to the second end. A fabric deployer is coupled to and extended from the sled adjacent to the second end. A sediment disruption device resides opposite the fabric deployer and faces the first end. The fabric deployer is a tubular structure having a slot therein extending lengthwise along the tubular structure facing away from the first end. A fabric cloth is disposed on an axle within the tubular structure so a distal end of the cloth protrudes from the slot. An electronics package is releaseably secured adjacent to the second end by a release mechanism and to the end of the cloth by a tether. A cathode may be connected to the electronics package, forming, with a buried fabric cloth anode, a microbial fuel cell.

11 Claims, 5 Drawing Sheets

SYSTEM FOR DEPLOYING FABRIC CLOTH IN MARINE SEDIMENT

CROSS-REFERENCE TO RELATED APPLICATIONS

This application claims the benefit of U.S. Provisional Patent Application Ser. No. 61/382,382, filed Sep. 13, 2010, entitled "Diver-Less Deployment Device for Sediment Microbial Fuel Cells," the content of which is fully incorporated by reference herein.

FEDERALLY SPONSORED RESEARCH AND DEVELOPMENT

The System for Deploying Fabric Cloth in Marine Sediment is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email ssc_pac_T2@navy.mil. Reference Navy Case No. 100737.

BACKGROUND

Microbial Fuel Cells (MFCs) are emerging as a viable power source in the marine environment. MFCs function through the transport of electrons from bacterial populations as a result of naturally occurring metabolic processes. The bacteria metabolize organic material in sediment on ocean floors, estuaries, and other similar environments. MFCs offer great potential as a continuous long term power source for low-power applications because they harness electricity from naturally occurring processes in the marine sediment, which naturally renews its fuel supply.

Carbon cloth is one type of anode that is used for MFCs. However, use of carbon cloth currently requires divers to manually bury the cloth in sediment, which is costly and time-consuming. A need exists for a device that can effectively and efficiently bury fabric cloth, such as carbon cloth, in marine sediment without the use of divers.

DETAILED DESCRIPTION OF SOME EMBODIMENTS

Figure 1:
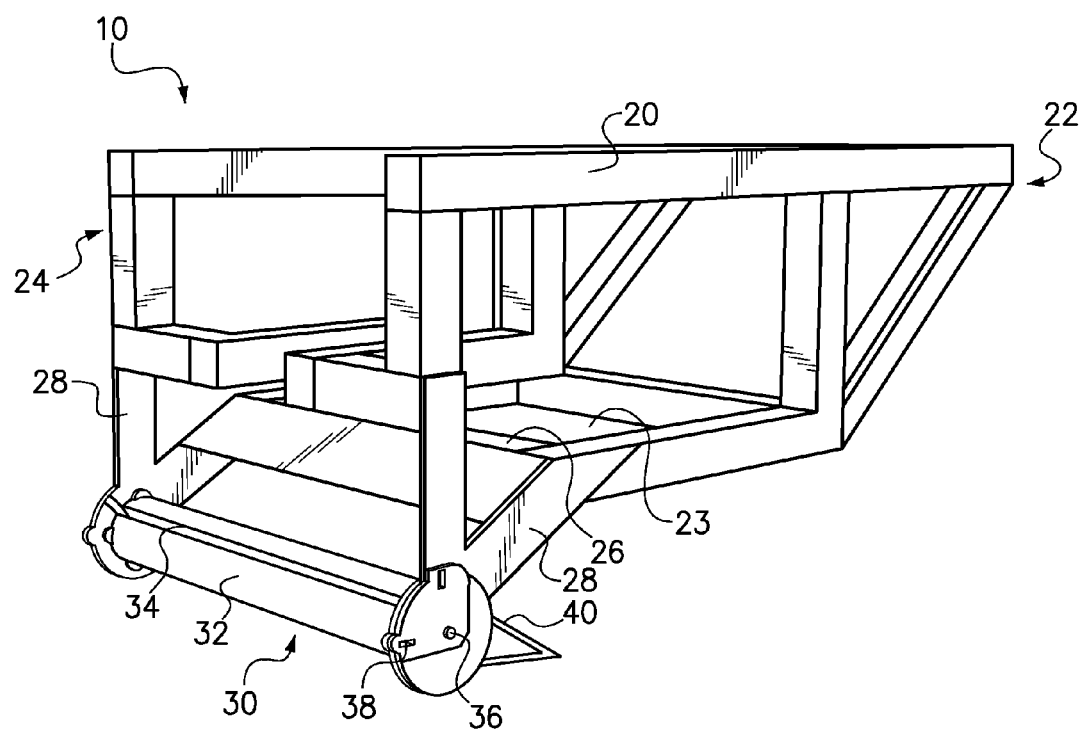
FIG. 1 shows a rear perspective view of an embodiment of a system in accordance with the System for Deploying Fabric Cloth in Marine Sediment.

FIG. 1 shows a rear perspective view of an embodiment of a system 10 in accordance with the System for Deploying Fabric Cloth in Marine Sediment. System 10 includes a sled 20 having a first end 22, a second end 24, and a partially-open bottom surface 26 proximate to second end 24. Partially-open bottom surface 26 includes a closed portion 23 to help prevent sled 20 from burying too deeply in marine sediment. As an example, closed portion 23 is comprised of sheet metal. A fabric deployer 30 is coupled to and extended from sled 20 adjacent to second end 24. In some embodiments, fabric deployer 30 is coupled to and extended from sled 20 by brackets 28. In other embodiments, sled 20 may be configured such that the brackets are formed within the body of sled 20.

It should be noted that sled 20 may have various configurations, as long as it contains a first end 22, second end 24, and partially-open bottom surface 26 proximate to second end 24. As such, one having ordinary skill in the art will recognize that various beams, cross-members, or other components may be incorporated into sled 20 to increase structural integrity or otherwise improve the sled design, in addition to or in lieu of, those shown in FIGS. 1-5. Thus, sled 20 may take the configuration as shown in FIGS. 1-5 or may comprise a rectangular frame, square frame, a relatively flat frame, or any other configuration as recognized by one having ordinary skill in the art. Further, sled 20 may be comprised of various materials including metal-based materials, such as stainless steel, or polymer-based materials. The size of sled 20 may be determined based upon the size of the fabric cloth to be deployed by fabric deployer 30.

Fabric deployer 30 comprises a tubular structure 32 having a slot 34 therein extending lengthwise along tubular structure 32 facing away from first end 22. A sediment disruption device 40 is located opposite fabric deployer 30 and faces first end 22. In some embodiments, fabric deployer 30 includes sediment disruption device 40. In such embodiments, fabric deployer 30 and sediment disruption device 40 are formed from one contiguous structure, as shown in FIGS. 1-4. In other embodiments, fabric deployer 30 and sediment disruption device 40 may comprise separate structures and may be coupled together via bonding, welding, or other coupling techniques. Sediment disruption device 40 may be wedge-shaped, configured as a blade, or have any other configuration that has an angular surface that allows system 10 to penetrate into marine sediment, as recognized by one having ordinary skill in the art.

A fabric cloth 50 (see FIG. 2) may be disposed on an axle 36 within tubular structure 32 such that a distal end 52 of the fabric cloth 50 protrudes from slot 34. As an example, fabric cloth 50 may be contained on a roll that is slid onto the axle. Access to the axle may be reached by removing a plate 38 that may be bolted or otherwise connected to bracket 28. In other embodiments, fabric deployer 30 may be detachable from sled 20, providing access to the axle.

In some embodiments, fabric cloth 50 is a conductive cloth, such as carbon cloth. Such a conductive fabric cloth may be useful for many applications, including use as an anode for microbial fuel cells (MFCs). The size of fabric cloth 50 may vary depending on the desired output requirement of the MFC. As an example, fabric cloth 50 may have the dimension of one meter by one meter. System 10 may further include a cathode 90 connected by an electrical connection to electronics package 70 (see FIGS. 5A-5E), to form the MFC. Cathode 90 is configured to float within the water, and may have a float attached thereto.

Figure 2A:
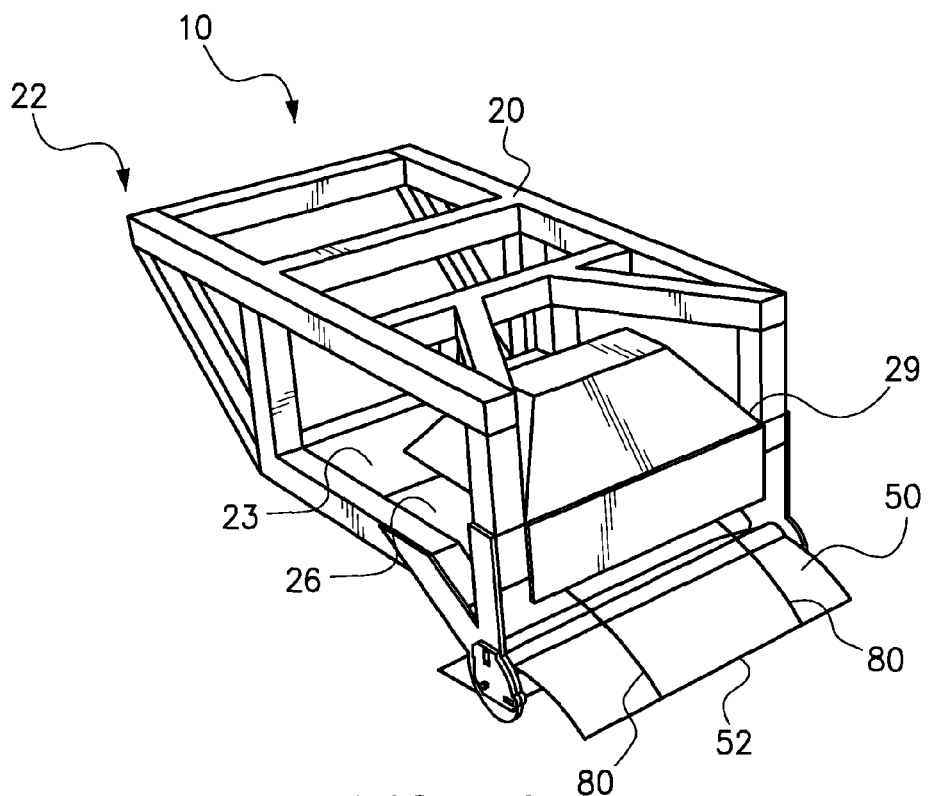
FIGS. 2A and 2B show top perspective views of an embodiment of a system with an electronics package in accordance with the System for Deploying Fabric Cloth in Marine Sediment.
Figure 2B:
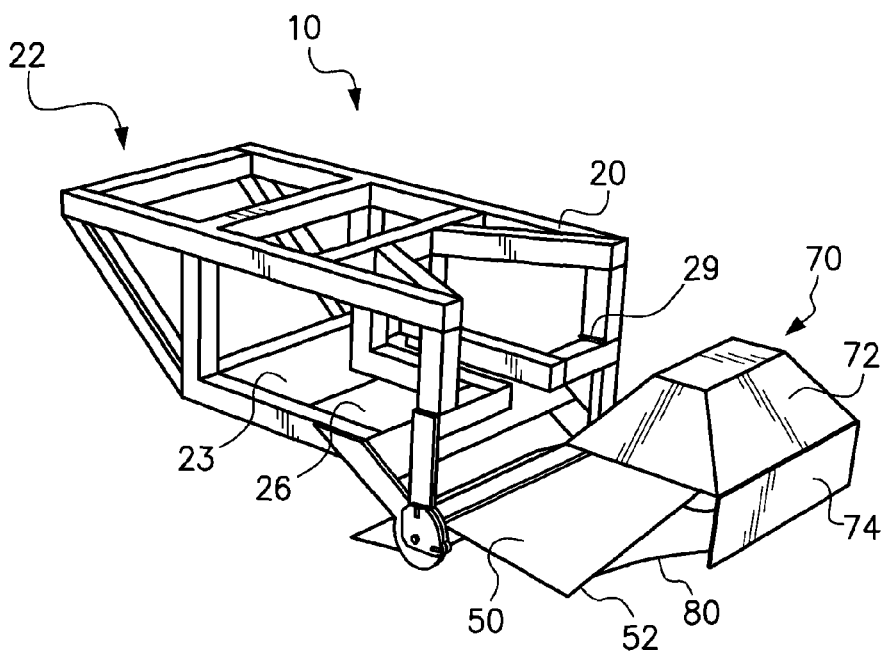
Figure 3:
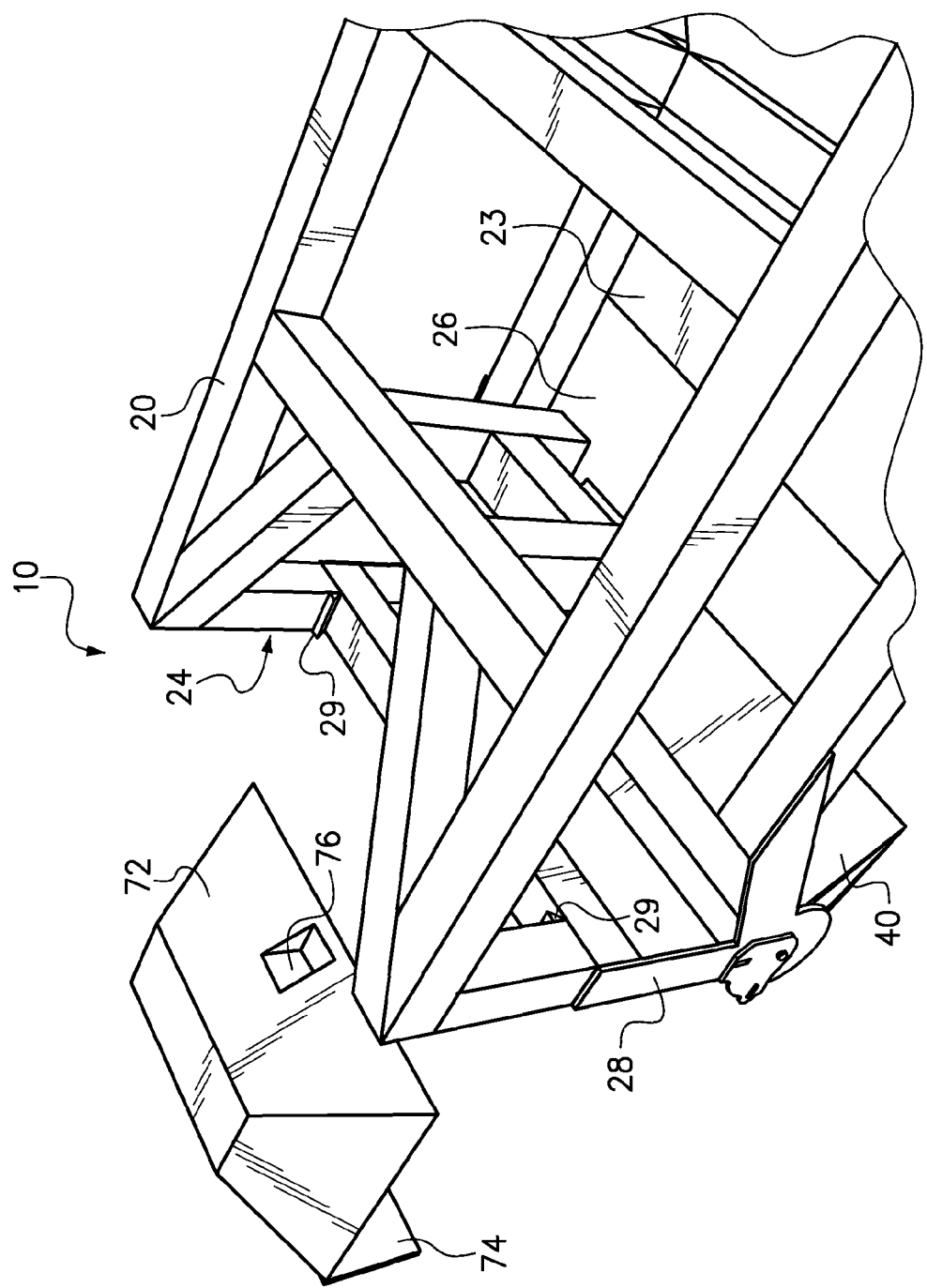
FIG. 3 shows a top perspective view of an embodiment of a system having an electronics package with a recessed magnet therein, in accordance with the System for Deploying Fabric Cloth in Marine Sediment.
Figure 4:
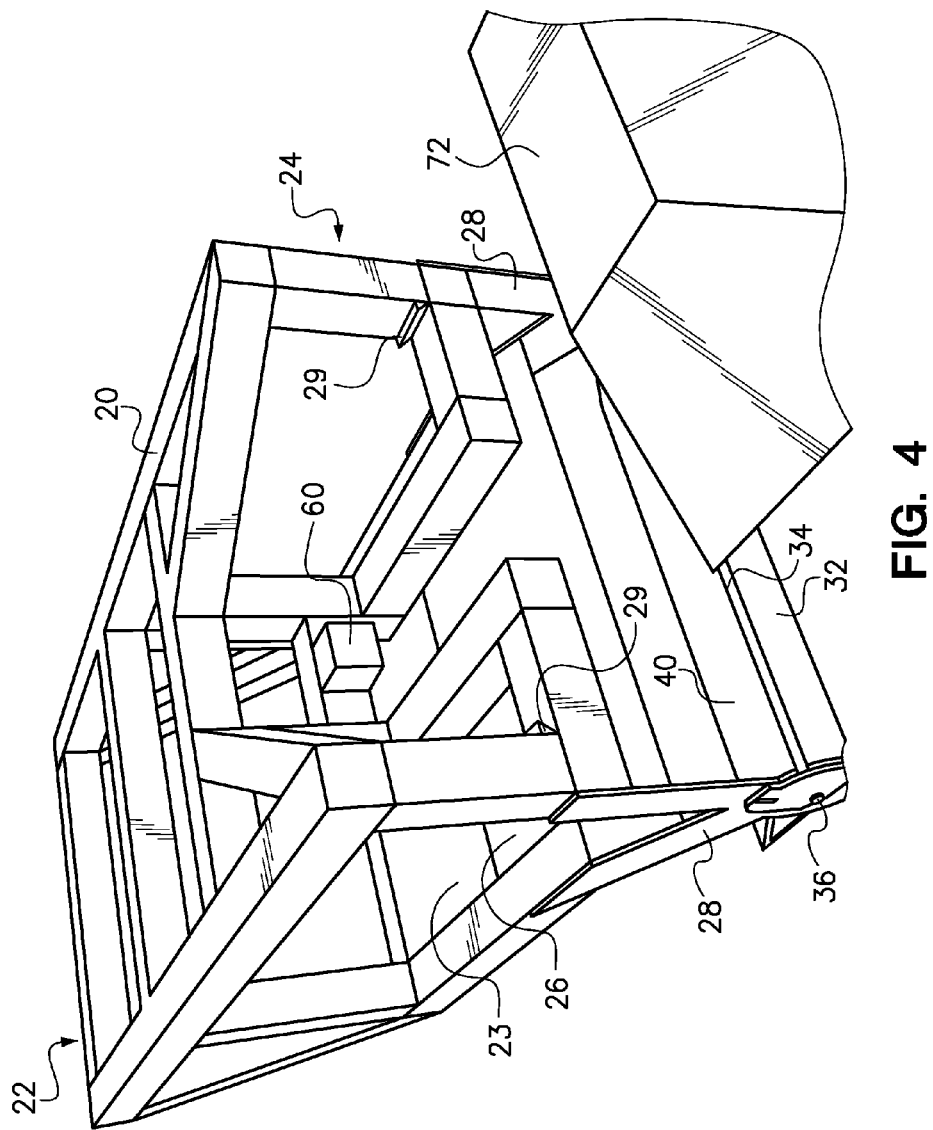
FIG. 4 shows a rear perspective view of an embodiment of a system with a release mechanism for engaging an electronics package with a recessed magnet therein, in accordance with the System for Deploying Fabric Cloth in Marine Sediment.

Referring to FIGS. 2-4, system 10 may further include a release mechanism 60 coupled to sled 20 adjacent to second end 24. Release mechanism 60 serves to releaseably secure an electronics package 70 to sled 20. Electronics package 70 may include an electronics unit 72 and a plate 74 coupled to the electronics unit 72. In such embodiments, plate 74 is also connected to the distal end 52 of fabric cloth 50 by one or more tethers 80. Electronics unit 72 contains circuitry needed for energy storage, power management, and load devices to be powered. Non-limiting examples of powered devices include data storage, data transmitters, data receivers, and sensors.

Electronics package 70 is also held into place within sled 20 by grooves 29 formed within sled 20. As discussed in more detail with respect to FIGS. 5A-5E, partially-open bottom surface 26 allows sediment to flow up through sled 20 to contact electronics package 70, in particular plate 74, and separate it from release mechanism 60, thus deploying electronics package 70 on the surface of the sediment. Grooves 29 help ensure that electronics package 70 only moves in a direction away from first end 22, rather than upward and off of sled 20, allowing for a controlled release of electronics package 70 opposite the direction of sled 20.

In some embodiments, release mechanism 60 is a magnet that protrudes from sled 20, as shown in FIG. 4. In such embodiments of system 10, electronics unit 72 may contain an electronics unit magnet 76 therein. As an example, electronics unit magnet 76 may be recessed within electronics unit 72, as shown in FIG. 3. Incorporating a recessed release mechanism helps to help prevent a trolling vessel from catching the electronics unit due to a protrusion that would have otherwise been present on electronics unit 72 due to the use of an alternate release mechanism. Electronics unit magnet 76 may also comprise several magnets (not shown) that are positioned on the outer surface of electronics unit 72.

In other embodiments, release mechanism 60 may be other types of mechanical release mechanisms recognized by one having ordinary skill in the art, such as Velcro®. In such an embodiment, the size of the contact area between the Velcro® release mechanism 60 and the corresponding Velcro® attachment on electronics package 70 may vary depending on factors such as the weight of electronics package 70 and the towing speed of sled 20, to ensure proper releasing and deployment of electronics package 70.

Referring to FIGS. 5A through 5E, diagrams are shown illustrating the burying of fabric cloth in marine sediment using an embodiment of a system 10. As an example, system 10 is designed to be deployed from a boat with a wench (not shown). System 10 is connected to the boat by a tether 11. The boat may be moved away from the drop point of system 10, wherein a boat wench can then tow system 10 along the marine sediment to the boat.

Figure 5A:
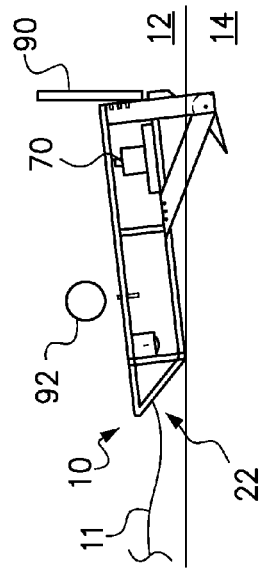
FIGS. 5A through 5E show diagrams illustrating the burying of fabric cloth in marine sediment using an embodiment of a system in accordance with the System for Deploying Fabric Cloth in Marine Sediment.
Figure 5B:
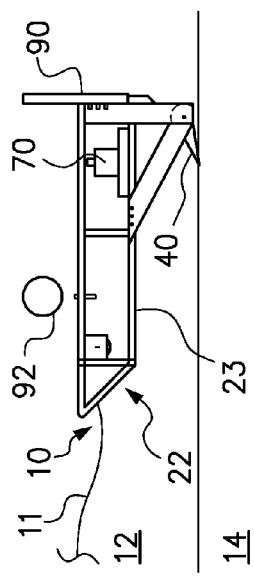
Figure 5C:
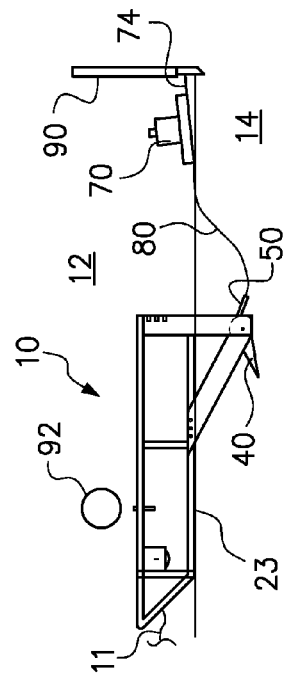

As shown in FIG. 5A, system 10 is in body of water 12, with sediment disruption device 40 positioned on the surface of marine sediment 14. Also shown is a float 92, which may be attached to the cathode to keeps it floating in the water column. When system 10 hits sediment 14, sediment disruption device 40 will touch first. Then, as front end 22 drops to the surface of sediment 14 as shown in FIG. 5B, sediment disruption device 40 will bury itself into sediment 14 until the bottom portion of sled 20 rests on the surface of sediment 14 as shown in FIG. 5C.

Figure 5D:
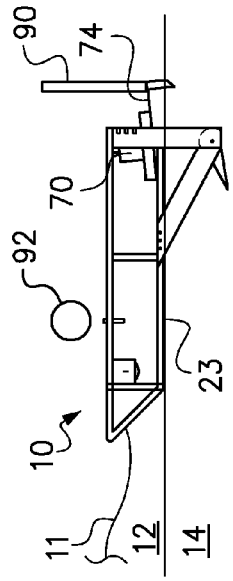

As system 10 is towed across the surface of sediment 14, sediment disruption device 40 will cause sediment to pile up above sediment disruption device 40 and to flow upward through partially open bottom surface 26 of sled 20 until it contacts electronics unit 72 and plate 74. Upon contact, the sediment will cause a force upon electronics unit 72 and plate 74 that is great enough to break the attraction between release mechanism 60 and electronics unit magnet 76, causing electronics package 70 to break free of sled 20, as shown in FIG. 5D.

Figure 5E:
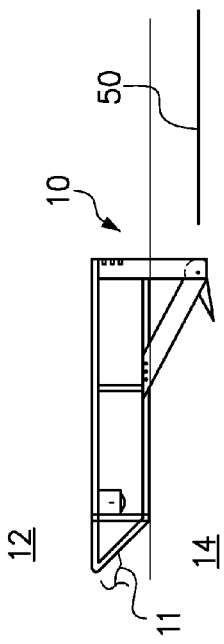

As electronics package 70 is connected to fabric cloth 50 by tethers 80, as electronics package 70 gets further away from sled 20, fabric cloth 50 is pulled through slot 34 into the sediment. As fabric cloth 50 is exposed to sediment 14, the sediment flowing upward through partially open bottom surface 26 moves through the back end of sled 20 and falls onto the area where fabric cloth 50 is exposed, thus burying fabric cloth 50 in the sediment. The final result is a buried fabric cloth as shown in FIG. 5E.

During the burying process, a driver of the boat towing system 10 will experience some resistance as fabric cloth 50 is being buried. After all of fabric cloth 50 has been pulled from fabric deployer 30, the resistance will lessen and the driver can begin to bring system 10 up to the surface of body of water 12. The deployment process may take several minutes. As an example, fabric cloth 50 may be buried 6-8 inches below the surface of the sediment. In many environments, disrupted sediment will settle over time and add, for example, 2-4 inches of sediment to further settle above the anode. Further, the configuration of system 10 shown in FIGS. 1-5 may operate in a water depth up to about 200 feet. However, other configurations may operate in greater depths.

Many modifications and variations of the System for Deploying Fabric Cloth in Marine Sediment are possible in light of the above description. Within the scope of the appended claims, the embodiments of the systems described herein may be practiced otherwise than as specifically described. The scope of the claims is not limited to the implementations and embodiments disclosed herein, but extends to other implementations and embodiments as may be contemplated by those having ordinary skill in the art.

We claim:

1. A system comprising:
a sled having a first end, a second end, and a partially open bottom surface proximate to the second end;
a fabric deployer coupled to and extended from the sled adjacent to the second end, a first side of the fabric deployer comprising a tubular structure having a slot therein extending lengthwise along the tubular structure facing away from the first end, a second side of the fabric deployer comprising a stationary sediment disruption device facing the first end;
a conductive fabric cloth disposed on an axle within the tubular structure such that a distal end of the conductive fabric cloth protrudes from the slot;
a release mechanism coupled to the sled adjacent to the second end; and
an electronics package, releaseably secured to the sled by the release mechanism, comprising an electronics unit and a plate coupled to and extending downward from the electronics unit, wherein the distal end of the plate is connected to the distal end of the fabric cloth by a tether, wherein when the electronics package is secured to the sled by the release mechanism the plate is vertically-oriented above the fabric deployer.

2. The system of claim 1, wherein the release mechanism is a magnet, wherein the electronics unit further comprises an electronics unit magnet therein.

3. The system of claim 2, wherein the electronics unit magnet is recessed within the electronics unit.

4. The system of claim 1 further comprising a cathode connected to the electronics package.

5. The system of claim 1, wherein the electronics unit comprises circuitry for energy storage, power management, and load devices to be powered.

6. The system of claim 1, wherein the fabric deployer is coupled to and extended from the sled by brackets.

7. A system comprising:
   a sled having a first end, a second end, a partially open bottom surface proximate to the second end, and at least two grooves formed therein proximate to the second end;
   a fabric deployer coupled to and extended from the sled adjacent to the second end, a first side of the fabric deployer comprising a tubular structure having a slot therein extending lengthwise along the tubular structure facing away from the first end, a second side of the fabric deployer comprising a stationary sediment disruption device facing the first end;
   a conductive fabric cloth disposed on an axle within the tubular structure such that a distal end of the fabric cloth protrudes from the slot;
   a release mechanism coupled to the sled adjacent to the second end;
   an electronics package, releaseably secured to the sled by the release mechanism and the grooves, comprising an electronics unit and a plate coupled to and extending downward from the electronics unit, wherein the distal end of the plate is connected to the distal end of the fabric cloth by a tether, wherein the electronics unit comprises circuitry for energy storage, power management, and load devices to be powered; and
   a cathode connected to the electronics package.

8. The system of claim 7, wherein when the electronics package is secured to the sled by the release mechanism the plate is vertically-oriented above the fabric deployer.

9. The system of claim 7, wherein the release mechanism is a magnet, wherein the electronics unit further comprises an electronics unit magnet therein.

10. The system of claim 9, wherein the electronics unit magnet is recessed within the electronics unit.

11. A method comprising the steps of:
   providing a sled having a first end, a second end, and a partially open bottom surface proximate to the second end, the sled having a fabric deployer coupled to and extended from second end, a first side of the fabric deployer comprising a tubular structure having a slot therein extending lengthwise along the tubular structure facing away from the first end, a second side of the fabric deployer comprising a stationary sediment disruption device facing the first end, wherein a conductive fabric cloth is disposed on an axle within the tubular structure such that a distal end of the conductive fabric cloth protrudes from the slot, wherein a release mechanism is coupled to the sled adjacent to the second end, wherein an electronics package is releaseably secured to the sled by the release mechanism, the electronics package comprising an electronics unit and a plate coupled to and extending downward from the electronics unit, wherein the distal end of the plate is connected to the distal end of the fabric cloth by a tether, wherein when the electronics package is secured to the sled by the release mechanism the plate is vertically-oriented above the fabric deployer;
   positioning the sled entirely within a body of water such that the stationary sediment disruption device is positioned on the surface of marine sediment; and
   towing the sled across the surface of the marine sediment.

* * * * *